Patented Jan. 31, 1939

2,145,816

UNITED STATES PATENT OFFICE 2,145,816

PURIFICATION OF ZINC SALT SOLUTIONS

Buren I. Stoops, Kennett Square, Pa., assignor to Hercules Powder Company, Wilmington, Del., a corporation of Delaware No Drawing. Application April 20, 1937, Serial No. 137,916

13 Claims. (Cl. 23—50)

This invention relates to a process for the purification of solutions of zinc salts and to the products thereof.

In the practice of this invention solutions of zinc salts produced from various sources, including relatively inexpensive and highly contaminated sources of zinc, are purified to remove all other metals that form sulphides which are insoluble in water, e. g., Fe, Mn, Pb, Cu, Cd, Co, As, Sb, Mo, Sn, Ni, Cr, etc., to produce a zinc salt solution free of, or containing a low content of, such heavy metals and especially containing less than 0.0005% (by weight on the zinc) of manganese. For some purposes it is not important to remove those of such metals (e. g. Ni) which, in the presence of ammonium hydroxide and an ammonia salt, are not precipitated before or with the zinc by hydrogen sulphide if an excess thereof is avoided.

The process of this invention includes an oxidation step and a treatment with a sulphide-precipitating agent of which hydrogen sulphide is an example. The relation of the steps of the process and the operating conditions thereof constitute important features of novelty of the process.

An important feature of the process resides in causing sufficient magnesium to be present in the solution after removal of precipitated sulphides to cause in the otherwise purified solution such precipitation of manganese not removed by those steps as to reduce the manganese content of the solution to or below 0.0005% by weight on the zinc in the solution, the magnesium preferably being present in slight excess, by weight, relative to the manganese present. A further feature of the invention resides in so coordinating the operating conditions that magnesium occuring in or added to the original zinciferous material will occur in sufficient quantity in the filtered and otherwise purified solution to cause such precipitation of manganese. In the practice of this invention there are produced from zinciferous materials containing substantial quantities of one or more of said heavy metals including manganese, purified zinc salt solutions in which the content of said metals is only determinable by spectroscopic analysis and in which manganese may be either entirely absent, or, in any event, present to the extent of less than 0.0005% on the zinc and the entire content of all metals other than zinc which produce water-insoluble sulphides may be less than 0.003% on the zinc and usually not in excess of 0.020%.

In the practice of this invention the procedure is varied, especially in the sequence of the steps, depending upon the composition of the zinciferous materials employed. To facilitate an understanding of this invention certain of such variations are described with the understanding that this invention is not limited thereto but that the variations are presented as being merely illustrative of the practice of this invention.

Certain zinciferous materials, such as roasted zinc ash (produced by the roasting in air of galvanizer's zinc skimmings), zinc oxide residues from organic chemical reduction, and roasted sal skimmings, may be free of As, Sb, and Mo, and preferably Cr, and contain not substantially more than 0.1% of Cd. In such case the zinciferous material may be treated with nitric acid, sulphuric acid or hydrochloric acid, or with an equi-molar mixture of aqueous ammonia and an ammonium salt, preferably with at least two molecules of each for each atom of Zn, to produce a zinc salt solution containing 100–250 gr. of zinc per litre. If there be any residue the solution can be decanted therefrom.

If the solvent was an acid, ammonia is passed through the solution while it is being agitated. Zinc hydroxide is first precipitated and the supply of ammonia is continued until all of the zinc hydroxide has been redissolved and the zinc is in the form of ammino-zinc salt. The reaction eventually heats the solution to its boiling point. Aluminum present in the original material is at this point precipitated as aluminum hydroxide and part of the iron and manganese present is precipitated as hydroxide and also part of the lead, if much be present. The precipitates may or may not be removed at this stage, as by filtration.

While being agitated the filtrate or slurry is subjected to an oxidation treatment of any type that will not introduce contamination, such as treatment with hydrogen peroxide or air blowing. Iron and manganese thereupon precipitate as $Fe(OH)_3$ and $MnO(OH)_2$. During the oxidation the solution is preferably at a temperature between 70° and 120° C. The precipitate is removed, as by filtration.

The filtrate from which have been removed Fe, Mn, Al and such Pb as had precipitated, while being agitated and at a temperature between 20° C. and 100° C. and preferably between 50° C. and 80° C., is treated with a sulphide-precipitating agent, such as hydrogen sulphide gas, preferably diluted with a diluent gas such as $CO_2$ to the extent of 25% to 75%. The solution then contains free ammonia and combined ammonia and if there is insufficient ammonia present to prevent precipitation of zinc hydroxide, ammonia is added in sufficient quantity to prevent such precipitation. The sulphide-precipitating treatment precipitates sulphides of Cu, Pb and some Cd and is continued until a little (less than 1% of the Zn in the solution) zinc sulphide is precipitated, or until it is otherwise, as by separate test, apparent that no more colored sulphides can be precipitated. If considerable copper is present precipitation thereof may cause nickel also to be precipitated. Sulphides, including hydrosulphides and polysulphides may be used, as the sulphide-precipitating agent, provided the solution is not thereby contaminated as by introduction of a metal that may be undesirable when the solution is used for some purposes or by leading to the presence of undesirable substances in the solution. For example, if zinc sulphide is to be precipitated from the solution, such a contamination may occur even though the sulphide of the metal involved is more soluble than zinc sulphide because of a tendency of the colloidal zinc sulphide precipitate to carry down salts of the contaminating metal, or polysulphides may occur in the solution which, while recognized as being water-soluble, nevertheless tend to impair zinc sulphide precipitate formed from the purified solution.

The resulting precipitate is then removed, as by filtration.

The clear solution is then set aside and if magnesium be present therein in a sufficient quantity manganese not removed by the preceding steps and in excess of .0005% on the zinc, or less, will be precipitated within two days as a brown precipitate to such extent that either characteristic lines of manganese may not be identifiable in the spectroscope or the manganese content may not be greater than 0.00007% on the solution or 0.0005% on the zinc. The purity of the solution in respect of other of said heavy metals that form water-insoluble sulphides is as above stated, although the solution may contain alkali, alkali earth, and other metals that form water-soluble sulphides.

This effect of magnesium can be obtained by having magnesium present in the original zinciferous material either by reason of addition or as a natural constituent of the zinc raw material, e. g. sufficient magnesium to cause at least some precipitation of the hydroxide thereof either upon the addition of ammonia to the initial acid solution or in the formation of the solution in a mixture of aqueous ammonia and ammonium salt. Excess magnesium, above the small amount which is soluble in a solution containing ammonium hydroxide and ammonium salt, is precipitated as magnesium hydroxide along with aluminum hydroxide when the solution is ammoniated, or if a solution of ammonium hydroxide and ammonium salt has been used instead of acid to extract the raw material, only the limited amount of magnesium which is soluble under such conditions will be obtained in the solution. Such magnesium content is ordinarily sufficient to cause precipitation of manganese that is not removed by the oxidation and sulphide treatments and will cause the manganese to be either entirely removed from that filtered solution or to be present to the extent of not more than .0005% on the zinc in this solution. The magnesium in the filtered solution should be present in a proportion by weight that is equal to or in excess of the manganese present in the freshly filtered solution. The conditions of operation are such that this content of magnesium is present in the filtered solution when sufficient magnesium is present in the zinciferous raw material.

Or, the desired precipitation of manganese in the filtered solution may be effected by adding thereto sufficient of a magnesium salt to provide in the filtered solution the content of magnesium above stated.

The filtered solution, after precipitation of manganese by reason of the content of magnesium therein, is an ammino zinc nitrate, sulphate, or chloride solution, that is substantially pure in respect of the metals above mentioned, although it may contain nickel and also metals (including alkali, alkali earth, and other metals) which produce water-soluble sulphides. The solution may contain traces of one or more of those metals other than zinc that produce water-insoluble sulphides.

An average of the spectroscopic analyses of several zinc salt solutions so produced, is as follows, the percentages being based on the zinc present.

| | |
|---|---|
| Iron | .0003% or less than .0005%. |
| Manganese | Absent, or less than .0002%. |
| Nickel | .0003% to .0025%. |
| Magnesium | About .01 to .015%. |
| Copper | Less than .0002% to .0008%. |
| Lead | Absent to less than .002%. |
| Aluminum | Absent to less than .005%. |
| Cadmium | Absent to less than .002%. |
| Antimony | Absent. |
| Tin | Do. |
| Chromium | Do. |
| Cobalt | Do. |

The notation "absent" means that the characteristic lines were not identifiable in the spectroscope.

Such degree of purity in respect of manganese is attainable, as a result of the precipitation due to the presence of magnesium, even though the manganese content prior to such precipitation was as high as .015% on the zinc. The resulting precipitate is removed by filtration and such removal of manganese is especially important when zinc sulphide is produced from the purified zinc solution, manganese sulphide acting strongly to impair the light resistance of the resulting zinc sulphide and possibly the natural whiteness thereof.

A specific example involving roasted zinc ash is as follows:

*Analysis of zinc ash*

| | Per cent |
|---|---|
| Zinc | 70.2 to 73.7 |
| Lead | 0.2 to 0.7 |
| Copper | 0.0 to 0.5 |
| Iron, manganese, etc. (as Fe₂O₃) | 1.4 to 3.74 |
| Magnesium | Present |
| Insoluble in aqua regia | 4.0 to 5.47 |

The above type of zinc ash may be acid extracted as follows:

| | Grams |
|---|---|
| Zinc ash | 715 |
| Nitric acid (66%) | 1475 |
| Water | 700 |

The acid is poured into the water and the zinc ash is added with agitation. After the extraction has been completed the solution is decanted or filtered from the residue. The filtrate is then ammoniated with $NH_3$ gas until the zinc hydroxide has been completely re-dissolved. The reaction heats the solution to boiling and while hot it is air blown to remove iron and manganese. The solution is filtered off and treated with $H_2S$ gas containing appreciable amount of $CO_2$ gas as diluent until no further heavy metal sulphide is formed on addition of more $H_2S$ gas. The solution is then filtered and allowed to stand to observe if further settling precipitate forms. These settling precipitates may consist of manganese and magnesium with traces of lead, copper, silver, etc. If a settling precipitate forms, it is filtered off and a sample is submitted for spectroscopic analysis. If the analysis shows the presence of heavy metals, further $H_2S$ treatment is given. If the analysis shows the presence of manganese, magnesium salt is added and settling continued. This process is repeated until the desired purity is obtained.

Zinciferous materials containing As, Sb, Mo, more than 0.1% of Cd and possibly Cr, of which examples are skimmings from melting pots of brass type alloys and zinciferous flue dust from secondary blast furnaces, may be purified in accordance with this invention. Such material is treated with an excess (1% to 2% excess) of nitric, sulphuric or hydrochloric acid to produce a solution containing 200 to 250 gr. of zinc per litre, the remaining slurry being separated and thoroughly washed with water, preferably by counterflow, but the wash water from the first extraction can be used to dilute the solution for a second acid extraction. Preferably the filtercake is washed until free of zinc and may then contain lead, tin and other metals not extractable by the acid. The resulting solution preferably has a temperature of 70° to 80° C.

The resulting solution is brought to a pH value of 3 to 4 by the addition of a little ammonia but preferably by the addition of zinc dust or zinc oxide, the solution being agitated during such neutralizing.

While this solution is kept at a temperature preferably above about 50° C. and below about 80° C., or such temperature as will prevent nitric acid from being driven off, and preferably while being agitated, and while the pH value thereof is maintained at 3 to 4 to prevent precipitation of zinc hydroxide that would occur if the pH value were above 4, the solution is subjected to a sulphide-precipitating treatment, e. g. treatment with hydrogen sulphide, and arsenic, antimony, cadmium and most other heavy metals present are precipitated as sulphides from the slightly acid solution. During the precipitation the pH value of the solution is maintained, as by addition of zinc oxide or ammonia, against falling substantially below 3 as a result of regeneration of acid by the action of hydrogen sulphide upon the salts present. The sulphide-precipitating treatment may involve a day or two of aging to allow Cd, As, and Sb to be completely precipitated. The sulphide-precipitating treatment is continued until the filtrate produces no further colored sulphide on addition of hydrogen sulphide thereto. The heavy metal sulphides are removed, as by filtration, and the clear solution may be treated with activated charcoal, if necessary, to remove therefrom any detrimental yellow color which may result from presence of colloidal substances. The clear solution is then ammoniated with ammonia gas added until all zinc precipitated by the addition of ammonia is in solution. All zinc present is then in solution as an ammino zinc salt. Heat is developed during this step but apparently the only effect thereof is to promote coagulation of subsequent precipitate.

The resulting ammoniated solution is subjected to oxidizing treatment as above described and is preferably hot if air blowing is employed. Removal of iron and manganese is effected and this operation requires about an hour. The precipitate is removed, as by being filtered out.

The filtrate is again subjected to sulphide-precipitating treatment, such as treatment with hydrogen sulphide, to remove any remaining heavy metals not removed by the sulphide-precipitating treatment performed while the solution was slightly acid. Any precipitate is removed, as by being filtered out.

The clear solution, with or without addition of magnesium salt, is now allowed to stand to effect further precipitation of manganese, as in the procedure above described, and any precipitate is removed therefrom.

As in the procedure above described, the final solution is so free of the metals removed by the treatment that their presence can only be determined by spectroscopic analysis, a typical result of such analysis (values being given in per cent. on the zinc) is as follows:

| | Per cent |
|---|---|
| Copper | .0003 to .0008 |
| Nickel | .001 to .002 |
| Iron | .0005 |
| Magnesium | About .01 or less |

The characteristic lines of other metals forming water-insoluble sulphides could not be identified in the spectroscope.

This feature of the procedure, i. e. initial precipitation from a solution that is kept slightly acid (pH 3–4), for the purpose of preventing precipitation of zinc hydroxide, instead of strongly acid (pH 1–2), causes the Pb and Cd to precipitate more completely, and practically quantitatively, if slightly aged. If the solution were more nearly neutral zinc hydroxide would precipitate from it. The precipitation is effected from a solution in which the salt concentration is many times (about 30) that occurring in ordinary analytical procedure. In the foregoing procedure Al is precipitated as aluminum hydroxide either when the pH value is brought to 3 to 4, or, in any event, when the solution is thereafter ammoniated.

If the flue dusts above referred to contain sulphates of lead, zinc, copper, etc., the soluble sulphates may be removed from the residue of the initial acid treatment by water extraction and thereby recovered as such in crystalline form, or they may be removed from the acid or ammino solution by adding calcium nitrate and filtering off the resulting calcium sulphate. In such case the slight solubility of the calcium salt in water necessitates the addition of barium nitrate to remove the last traces of sulphate. If desirable, ammonium sulphate can be removed from the ammonium nitrate solution after the precipitation of zinc sulphide therefrom. The choice of which of these methods is employed for removing sulphates will depend upon the use to which the zinc solution is put.

In this variation of the procedure, the use of nitric acid leaves tin and lead in the undissolved residue.

A specific example involving flue dust from secondary copper blast furnaces is as follows:

The principal constituents of this material are:

| | Per cent |
|---|---|
| Zinc | 57.6 |
| Lead | 8.4 |
| Sulphate (as SO₄) | 7.6 |
| Manganese | Up to 0.1 |
| Copper | 1.59 |
| Tin | 1.86 |
| Magnesium | Present |
| Arsenic | About 1.0 |
| Antimony | About 0.5 |
| Cadmium | About 2.0 |
| Iron | About 0.5 |
| Molybdenum | About 0.01 |

This material was extracted as follows:

| | Grams |
|---|---|
| Flue dust | 2000 |
| Nitric acid (66%) | 4000 |
| Water | 1000 |

The acid and water were blended and the flue dust was added with continuous agitation. After completion of the extraction, the solution was filtered off and zinc oxide was added to bring the pH into the range 3.0–4.0 and H₂S gas was added to precipitate the heavy metal sulphides. During this operation zinc oxide was added to neutralize the acid set free by the sulphide precipitation and so maintain a pH of 3 to 4. When no further heavy sulphides came out on H₂S treatment, the solution was filtered, and the filtrate was again treated with H₂S and allowed to stand for two days. This caused the precipitation of the sulphides of cadmium, arsenic, etc., that did not come down at first. These sulphides were filtered off and the filtrate was treated with activated carbon to remove colloidal material that passed through the filter, and filtered again. The solution was then ammoniated with NH₃ gas until all of the zinc hydroxide was again in solution. The solution was then air blown while hot to remove iron and manganese. The precipitate formed was filtered off and the solution was again treated with H₂S gas to remove any further heavy metal sulphides not removed in the treatment at pH 3–4. After filtering, the solution was allowed to stand to observe whether settling precipitates would form. Any precipitate that formed was filtered off and the filtrate was tested spectroscopically for impurities. If heavy metals were present an additional H₂S treatment was given. If manganese was still present, magnesium salt was added to remove it. This process was continued until the desired purity was obtained.

In each of the foregoing procedures the final solution is an ammino zinc salt solution of high purity, especially in respect of heavy metals, or metals that form any insoluble sulphides, and contains 160 gr. to 200 gr. of zinc per litre, and the solution is well adapted to any desired use, especially the production of zinc sulphide or oxide pigments of high purity, whiteness and light resistance.

Purified zinc salt solutions made in accordance with this invention are useful in any procedure where solutions of the character above described are desirable, and such solutions will produce, especially in accordance with the procedure of the co-pending application of Donald G. Morrow, Serial No. 22,583, filed May 21, 1935, zinc sulphide pigments of high purity, whiteness and light resistance as therein more specifically identified. In accordance with that procedure the purified ammino zinc salt solution having a concentration of 160 to 200 gr. of Zn per litre, being at a temperature between 50° and 80° C., containing a high concentration of, or being saturated with, or containing an excess of ammonia, and while being agitated, is contacted with hydrogen sulphide, preferably carrying 25 to 50% of a diluent gas, and the desired high concentration of ammonia is maintained and the supply of hydrogen sulphide is stopped before any substantial excess thereof is used. The resulting precipitate is washed, preferably with ammonium hydroxide, to a content of less than 0.2% of salts and contains after washing 2.0% to 2.5% of ammonia so associated with the ZnS that it is not removed by drying to constant weight at 120° C. After drying, calcining, milling, drying and disintegrating, the resulting zinc sulphide pigment is of high purity, is inherently alkaline without end-pointing or alkalizing treatment, contains less than about .001% of metals other than zinc, and has a pH of 8 to 9. The action of the purified ammino zinc salt solution of this invention in that process and the purity of the final product constitute a definite identification of the properties of the purified ammino zinc salt solution.

I claim:

1. In a process for the production of purified ammino zinc salt solution from zinciferous raw material containing manganese, wherein an ammino zinc-containing solution extracted from the material is subjected to treatment for the removal of impurities, the step comprising controlling the treatment of the said extracted solution whereby the ammino zinc salt solution finally resulting from said treatment contains magnesium in excess by weight of the manganese therein, the said magnesium being present in the form of a water soluble salt, and allowing said last named solution to stand until said manganese is substantially completely precipitated by said excess of magnesium.

2. In a process for the production of purified ammino zinc salt solution from zinciferous raw material containing manganese, wherein an ammino zinc-containing solution extracted from the material is subjected to treatment for the removal of impurities, the step comprising causing the said extracted ammino zinc-containing solution resulting from said treatment to contain magnesium in the form of a salt soluble in said extracted solution, and allowing said last named solution to stand until the manganese therein is substantially completely precipitated by said magnesium.

3. In a process for the production of purified ammino zinc salt solution from zinciferous raw material containing manganese, wherein an ammino zinc-containing solution extracted from the material is subjected to treatment for the removal of impurities, the step comprising causing the extracted ammino zinc-containing solution to contain such proportion of magnesium that a part of it is precipitated in the extract as magnesium hydroxide when ammonia is present therein to the saturation point thereof in said solution, and allowing said solution to stand until the manganese is substantially completely precipitated by the magnesium content of said solution.

4. In a process for the production of purified ammino zinc salt solution from zinciferous raw material containing manganese, wherein a ammino zinc-containing extract of the material is subjected to treatment for the removal of impurities, the step comprising adding magnesium to the ammino zinc-containing solution resulting from said treatment, the added magnesium being in the form of a water soluble salt thereof, and allowing said last named solution to stand until the manganese is substantially completely precipitated by the action of said water soluble salt of magnesium.

5. In a process for the production of purified ammino zinc salt solution from zinciferous raw material containing manganese, wherein an ammino zinc-containing extract of the material is subjected to treatment for the removal of impurities, the step comprising adding magnesium in the form of a water soluble salt to the ammino zinc-containing solution resulting from said treatment, the added magnesium being in excess by weight of the manganese in said solution, and allowing said last named solution to stand until the manganese is substantially completely precipitated from said solution by said magnesium salt.

6. In a process for the production of purified ammino zinc salt solution from zinciferous raw material containing manganese, wherein an ammino zinc-containing solution extracted from the material is subjected to treatment for the removal of impurities, the steps comprising controlling the treatment producing the extracted ammino zinc-containing solution whereby the latter solution resulting from said treatment contains magnesium, and allowing the last named solution to stand in the presence of a soluble magnesium salt until a manganese-containing precipitate is formed.

7. In a process for the production of purified zinc salt solution from zinciferous raw material containing manganese, wherein the zinc is in solution in the form of ammino zinc salt, the steps comprising subjecting the solution to oxidation treatment, removing resulting precipitate, then subjecting the solution to sulphide-precipitating treatment to precipitate sulphides of metals other than zinc, removing precipitated sulphides, and allowing the resulting solution to stand in the presence of a soluble magnesium salt until a manganese-containing precipitate is formed.

8. In a process for the production of purified zinc salt solution from zinciferous raw material containing manganese, wherein the zinc is in solution in the form of an ammino zinc salt, the steps comprising causing such quantity of magnesium to be present with the material that magnesium hydroxide is precipitated in said solution, subjecting said solution to oxidizing and sulphide-precipitating treatments, removing precipitate from the solution, and then allowing said solution to stand in the presence of a soluble magnesium salt until a manganese-containing precipitate is formed.

9. In a process for the production of purified ammino zinc salt solution from zinciferous raw material containing manganese, the steps comprising extracting the material with acid, raising the pH value of the solution to about 3-4, then subjecting the solution to sulphide-precipitating treatment while maintaining said pH value, removing precipitated sulphides, then treating the solution with ammonia to form a clear solution in which zinc is present in the form of ammino zinc salt, and treating the ammoniated solution for removal of further impurities including manganese and iron, said last named treating including allowing said ammoniated ammino zinc salt-containing solution to stand in the presence of a soluble magnesium salt until a manganese-containing precipitate is formed.

10. In a process for the production of purified ammino zinc salt solution from zinciferous raw material containing manganese, the steps comprising extracting the material with acid, raising the pH value of the solution to about 3-4, then subjecting the solution to sulphide-precipitating treatment while maintaining said pH value, allowing the solution to stand until precipitation of cadmium, arsenic and antimony is substantially complete, removing the precipitated sulphides, then treating the solution with ammonia to form a clear solution in which zinc is present in the form of ammino zinc salt, and then treating the ammino zinc salt-containing solution for the removal of further impurities including iron and manganese, said last named treating including allowing said last mentioned solution to stand while containing a water soluble magnesium salt in excess of the manganese in said last named solution until the manganese is substantially completely precipitated.

11. In a process for the production of purified ammino zinc salt solution from zinciferous raw material containing manganese, the steps comprising extracting the material with acid, raising the pH value of the solution to about 3-4, then subjecting the solution to sulphide-precipitating treatment while maintaining said pH value, removing precipitated sulphides, then adding ammonia to the solution until it is clear and the zinc is present in the form of ammino zinc salt, subjecting the ammoniated solution to oxidizing treatment while hot, then subjecting the solution to sulphide-precipitating treatment and removing the resulting precipitate, and allowing the last-mentioned solution to stand in the presence of a soluble magnesium salt in excess of the manganese in said last mentioned solution until the manganese is substantially completely precipitated.

12. In a process for the production of purified zinc ammino salt solutions from zinciferous raw material containing manganese wherein an ammino zinc-containing extract of the material is subjected to treatment for removal of impurities, the steps comprising adding water soluble magnesium salt to the ammino zinc-containing solution resulting from said treatment and allowing said last named solution to stand until a manganese-containing precipitate is formed, and then filtering said last named solution to remove said precipitate.

13. In a process for the production of purified zinc ammino salt solution from zinciferous raw material containing manganese, the steps comprising extracting the material with acid, raising the pH value of the solution to about 3-4, then subjecting the solution to sulphide precipitating treatment while maintaining the pH value, removing the precipitated sulphides, then adding ammonia to the solution until it is clear and the zinc is present in the form of ammino zinc salt, subjecting the ammoniated solution to oxidizing treatment while hot, then subjecting the solution to sulphide-precipitating treatment and removing the resulting precipitate, adding water soluble magnesium salt so that the magnesium content is in excess of the manganese content of said last-mentioned solution, allowing the solution to stand until a manganese-containing precipitate is formed and then removing said last mentioned precipitate.

BUREN I. STOOPS.